(12) United States Patent
Finkenbinder (10) Patent No.: US 6,695,580 B2
(45) Date of Patent: Feb. 24, 2004

(54) MOTOR/FAN ASSEMBLY HAVING A RADIAL DIFFUSER BYPASS

(75) Inventor: David B. Finkenbinder, Ravenna, OH (US)

(73) Assignee: Ametek, Inc., Kent, OH (US)

( * ) Notice: Subject to any disclaimer, the term of this patent is extended or adjusted under 35 U.S.C. 154(b) by 0 days.

(21) Appl. No.: 10/177,219

(22) Filed: Jun. 21, 2002

(65) Prior Publication Data
US 2002/0159887 A1 Oct. 31, 2002

Related U.S. Application Data (63) Continuation of application No. 09/714,088, filed on Nov. 16, 2000, now Pat. No. 6,439,843.

(51) Int. Cl.⁷ .............................................. F04D 29/44
(52) U.S. Cl. ................... 415/208.3; 415/211.1
(58) Field of Search .................... 415/172.1, 208.2, 415/208.3, 211.1, 211.2, 226, 206, 224.5, 228; 417/423.1, 423.14

(56) References Cited

U.S. PATENT DOCUMENTS

| | | |
|---|---|---|
| 1,524,899 A | 2/1925 | Wise et al. |
| 1,525,884 A | 2/1925 | Plummer |
| 2,013,499 A | 9/1935 | Meckenstock |
| 2,023,259 A | 12/1935 | Anderson |
| 2,247,890 A | 7/1941 | Reardon |
| 2,286,993 A | 6/1942 | Naul |
| 2,726,807 A | 12/1955 | Lewis |
| 2,822,122 A | 2/1958 | Cole |
| 2,869,471 A | 1/1959 | Copeland |
| 2,875,947 A | 3/1959 | Bradley |
| 2,888,192 A | 5/1959 | Cole et al. |
| 3,592,566 A | 7/1971 | Beardslee |
| 3,749,956 A | 7/1973 | Riess |

(List continued on next page.)

FOREIGN PATENT DOCUMENTS

| | | | |
|---|---|---|---|
| DE | 164576 | 8/1904 | |
| DE | 2604133 | 8/1976 | |
| DE | 3802890 A1 | 8/1989 | |
| EP | 0 023 609 A1 | 7/1980 | |
| EP | 167873 A1 | 1/1986 | |
| EP | 0 552 978 A2 | 1/1993 | |
| GB | 757870 A | 9/1956 | |
| JP | 54-40311 | 3/1979 | |
| JP | 57-108499 | 7/1982 | |
| JP | 59-74397 | 4/1984 | |
| JP | 60-153498 | 8/1985 | |
| JP | 60-233397 | * 11/1985 | ............. 415/208.3 |
| JP | 62-166747 | 7/1987 | |

(List continued on next page.)

Primary Examiner—Christopher Verdier
(74) Attorney, Agent, or Firm—Renner, Kenner, Greive, Bobak, Taylor & Weber (57) ABSTRACT

A bypass motor assembly includes a motor having a rotatable shaft, a working air fan secured to the rotatable shaft and a shroud having an intake eyelet and at least one exhaust apertures. The assembly includes an end bracket having a shaft hole through which the shaft extends. The end bracket and the shroud partially enclose the working air fan, wherein rotation of the working air fan draws air in through the intake eyelet and pushes the air through the plurality of exhaust apertures, the end bracket having a plurality of vanes that form a fan chamber that receives the working air fan such that air expelled by the working air fan is efficiently re-directed by the vanes toward the exhaust aperture. An air intake seal can be disposed between the shroud and the working air fan to further enhance the working air flow.

2 Claims, 6 Drawing Sheets

U.S. PATENT DOCUMENTS

| | | |
|---|---|---|
| 3,779,667 A | 12/1973 | Johnson |
| 4,057,370 A | 11/1977 | Numata et al. |
| 4,128,778 A | 12/1978 | Merkle et al. |
| 4,552,518 A | 11/1985 | Utter |
| 4,669,952 A | 6/1987 | Forsyth, III et al. |
| 4,679,990 A | 7/1987 | Yamaura et al. |
| 4,767,285 A | 8/1988 | Jyoraku et al. |
| 4,808,090 A | 2/1989 | Evans |
| 4,908,538 A | 3/1990 | Geberth, Jr. |
| 5,296,769 A | 3/1994 | Havens et al. |
| 5,394,041 A | 2/1995 | Oberdorfer-Bogel |
| 5,734,214 A | 3/1998 | Gilliland et al. |
| 6,166,462 A | 12/2000 | Finkenbinder et al. |
| 6,439,843 B1 * | 8/2002 | Finkenbinder ........... 415/208.3 |

FOREIGN PATENT DOCUMENTS

| | | |
|---|---|---|
| JP | 63-109300 | 5/1988 |
| JP | 3-018699 | 1/1991 |
| JP | 3-023399 | 1/1991 |
| JP | 03-105099 | 5/1991 |
| JP | 3-138492 | 6/1991 |
| JP | 4-164199 | 6/1992 |
| JP | 4-187898 | 7/1992 |
| JP | 5-302594 | 11/1993 |
| JP | 6-123297 | 5/1994 |
| SU | 806905 | 3/1981 |
| SU | 1252556 | 8/1986 |
| SU | 1272006 | 11/1986 |

* cited by examiner

MOTOR/FAN ASSEMBLY HAVING A RADIAL DIFFUSER BYPASS

CROSS REFERENCE TO RELATED APPLICATION

This is a continuation of patent application Ser. No. 09/714,088, filed Nov. 16, 2000, entitled "Motor/Fan Assembly Having a Radial Diffuser Bypass" which matured into U.S. Pat. No. 6,439,843 on Aug. 27, 2003.

TECHNICAL FIELD

The invention herein resides in the art of dynamoelectric machines and, more particularly, in the art of bypass motor/fan assemblies. Particularly, the invention relates to a bypass motor assembly in which the working air is provided with a laminar outward and downward exhaust flow path, greatly increasing the efficiency of the assembly. An air intake seal is also provided to improve the assembly's efficiency.

BACKGROUND ART

Presently, many pieces of cleaning equipment are subjected to water or moisture. Particularly, wet/dry vacuum cleaners such as those known as utility vacs and carpet extractors operate in an environment in which the debris which is extracted from the surface being cleaned is laden in a mixture of air and water. In order to prevent the moisture laden air from entering the vacuum generating motor, bypass motors are typically used in these operations. As is known to those skilled in the art, a bypass motor/fan assembly is one in which the working air, generated by a working air fan, never passes through the motor, but is totally isolated from the motor. The motor itself may have a separate motor cooling air fan which draws cooling air over the motor armature and field. Accordingly, the working air and the motor cooling air take totally separate paths, and do not mix—except possibly in an exhaust area. While both the motor cooling fan and the working fan operate on the same shaft, in a bypass motor the chambers for the working air and motor cooling air are separate and distinct from each other such that moisture laden air never enters the motor.

In the past, bypass motors have typically positioned a working air fan at an end of the motor/fan shaft, with the fan rotating within a fan shell, which is sometimes called a shroud. The shell defines a chamber within which the fan operates. An end of the fan shell is provided with an air intake, with the circumference or periphery of the shell being defined by a plurality of spaced apart exhaust apertures. The intake aperture communicates with a vacuum chamber in the cleaning device, while the exhaust ports communicate with the ambient. Typically, the fan shell simply defines a chamber in which the fan rotates and, accordingly, that chamber becomes pressurized such that the air therein eventually finds its way to an exhaust port. However, with this type of a structure, the fan operation is quite inefficient.

Those skilled in the art will appreciate that previously known bypass motors are highly inefficient. The pressurization of the fan chamber and the indirect exhausting of the air therefrom gives rise to inherent air flow inefficiencies. Accordingly, there is a need in the art for a highly efficient and quiet bypass motor for use in motor/fan applications involving moisture laden air.

One attempt at improving bypass motors is disclosed in the U.S. patent application Ser. No. 09/072,035, entitled "Bypass Motor/Fan Assembly Having Separate Working Air Passages," which is assigned to the Assignee of the present invention and incorporated herein by reference. This application discloses a fan end bracket, positioned below a bottom surface of the working air fan in such a way that the working air is moved out and down through separate and distinct exhaust apertures that are aligned with exhaust ports of the fan shell or shroud. Although this is an improvement over previously known bypass motor/fan assemblies, turbulence still occurs. Accordingly, there is still a need in the art for improvement in the efficiency of a bypass motor for use in motor/fan applications.

DISCLOSURE OF INVENTION

In light of the foregoing, it is a first aspect of the present invention to present a bypass motor/fan assembly in which the working air is exhausted through gradually expanding vanes of uniform cross-section, thereby increasing efficiency.

Another aspect of the present invention is the provision of a bypass motor/fan assembly in which the working air fan is maintained in a fan cavity formed by the vanes of a fan end bracket and in which the plurality of vanes are positioned in close proximity to the exhaust ports of the working air fan.

Yet another aspect of the present invention is to provide a bypass motor/fan assembly, as set forth above, in which a channel formed between the vanes gradually expands which, in turn, places exhaust air in an annular gathering chamber and then out through the exhaust apertures of a fan shroud.

A further aspect of the present invention is to provide a bypass motor/fan assembly, wherein the fan shroud provides a logarithmic-shaped discharge area that gradually increases in size until tangentially exhausted.

Still another aspect of the present invention is to provide a bypass motor/fan assembly, as set forth above, in which an interior surface of the fan shroud contacts at least a portion of each vane's top edge.

Still yet another aspect of the present invention is to provide a bypass motor/fan assembly, as set forth above, in which an air intake seal is disposed between the shroud and the working air fan to directly transition inflowing air into the working air fan.

The foregoing and other aspects of the present invention, which shall become apparent as the detailed description proceeds, are achieved by a bypass motor assembly, comprising a motor having a rotatable shaft, a working air fan secured to the rotatable shaft, a shroud having an intake eyelet and at least one exhaust aperture, an end bracket having a shaft hole through which the shaft extends, the end bracket and the shroud partially enclosing the working air fan, wherein rotation of the working air fan draws air in through the intake eyelet and exhausts the air through at least one exhaust aperture, and the end bracket having a plurality of vanes that form a fan chamber that receives the working air fan such that air expelled by the working air fan is re-directed by the vanes toward at least one exhaust aperture.

Other aspects of the present invention are attained by a bracket for a bypass motor assembly which includes a tapered working fan rotated by a motor shaft, wherein the tapered working fan is partially enclosed between a shroud and the bracket, the bracket comprising a base having a periphery, a shoulder extending from the periphery, and a plurality of vanes extending from the shoulder, the plurality of vanes facilitating movement of air expelled by the tapered working fan out the shroud.

Still another object of the present invention is attained by a motorized fan assembly, comprising an end bracket with a rotatable shaft therethrough, a shroud having an intake eyelet and a plurality of exhaust apertures, the shroud enclosing the end bracket, a fan connected to the rotatable shaft, and rotatably received between the end bracket and the shroud, and an air intake seal disposed between the shroud and the fan.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention reference should be made to the following detailed description and accompanying drawings wherein.

BEST MODE FOR CARRYING OUT THE INVENTION

Referring now to the drawings and, more particularly, to FIGS. 1–4, it can be seen that a bypass motor/fan assembly made in accordance with the invention is designated generally by the numeral 10. The assembly 10 includes a motor housing 12 that carries an electrical motor which receives power and rotates a shaft 14 as is well known in the art. A plurality of standoffs 16 are disposed around the periphery of the motor housing 12 to support a working air fan assembly, designated generally by the numeral 20. The standoffs 16 form a gap 22 between the working air fan assembly 20 and the housing 12 so as to allow cooling air to be drawn through the motor housing 12.

The working air fan assembly 20 has three major components: a diffuser end bracket, designated generally by the numeral 24; a fan 26; and a shroud, designated generally by the numeral 28. The shaft 14 extends through the diffuser end bracket 24 and is connected to the fan 26. The shroud 28, along with the end bracket 24, partially encloses the fan 26. The shroud 28 provides a working air intake eyelet 30 which is centrally disposed so that working air is axially drawn into the fan 26 which then radially moves the working air.

The end bracket 24 includes a lip 34 which forms an outer rim 36. A sloping shoulder 38 curvilinearly extends from the outer rim 36 to an inner rim 40. Centrally disposed within the inner rim 40 is a base 42. Extending through the base 42 is a bearing/shaft hole 48 which receives a bearing sleeve 50 within which the shaft 14 is journaled.

A plurality of vanes 52 radially and curvilinearly extend from the inner rim 40 and along a substantial portion of the sloping shoulder 38. Each vane has a top edge 54 that follows the shape of the shoulder 38. In other words, the height of the top edge 54, with respect to the shoulder 38, remains substantially the same. Each vane has a leading end 56 proximal the inner rim and a trailing end 58 proximal the outer rim 36. Each vane has a fillet 60 which provides a smooth transition between the vane 52 and the shoulder 38. Adjacent vanes 52 form a channel 64 therebetween which gradually expands the working air flow from the inner rim toward the outer rim. Between the trailing ends 58 and the outer rim 36, a gathering chamber 68 is formed when the shroud 20 is secured to the end bracket 24. It will be appreciated that a periphery formed by the trailing ends 58 is positioned at about a mid-point between the outer diameter of the working air fan 26 and the inner diameter of the shroud 28 when affixed to the bracket 24. The leading ends 56, along with the base 42 and the inner rim 40, form a fan chamber 46 that is sized to receive the outer periphery of the fan 26. The vanes 52 tangentially fan out from the fan chamber 46 to the gathering chamber 68.

The working air fan 26 includes a flat disc 76 and a tapered disc 78. The discs 76 and 78 are connected to one another by a plurality of curvilinear fan vanes 80, as is well known in the art. The tapered disc 78 has a fan eye hole 82 which is aligned with the intake eyelet 30. The fan vanes 80, along with the outer periphery of the discs 76 and 78, form fan exhaust ports 84 which are equally distributed about the periphery of the fan 26. Collectively, the ports 84 can be referred to as an exhaust region 86. The fan 26 is attached to the shaft 14 by a washer 88, which bears against the flat disc 76, and a nut 90.

The shroud 28 is generally cup-shaped and includes a tapered plate 94 with a downwardly extending sidewall 96. The shroud 28 is press-fit onto the end bracket 24. Of course, fasteners and the like could be used. When assembled, the tapered plate 94 and the tapered disc 78 form a gap 97 therebetween. The sidewall 96 provides a plurality of shroud ports 98 which are oriented in the same curvilinear direction as the vanes. The underside of the tapered plate 94 is placed in close, touching contact with the top edges 54 at least at their respective leading ends 56. Accordingly, at least a portion of each channel 64 is a fully enclosed passage way. With the foregoing construction, the discharge area or gathering chamber 68 is of a volumetric proportion slightly greater than the outlet discharge area of the guide vanes 52. The vanes 52 end in a radial form, as does the fan 26 and the shroud 28. As the working air is exhausted from the fan 26, it has radial and straight components that move axially toward the outer rim 36 in a series of annular rings toward the shroud ports 98. These "annular rings" of air are then sequentially exhausted through the ports 98.

Although not wanting to be bound by theory, it is believed that the leading ends 56 do about 95% of the work in moving the air toward the ports 98. The configuration of the vanes past the leading ends is less critical, although it is desirable that they provide an unimpeded, orderly discharge.

Figure 5:
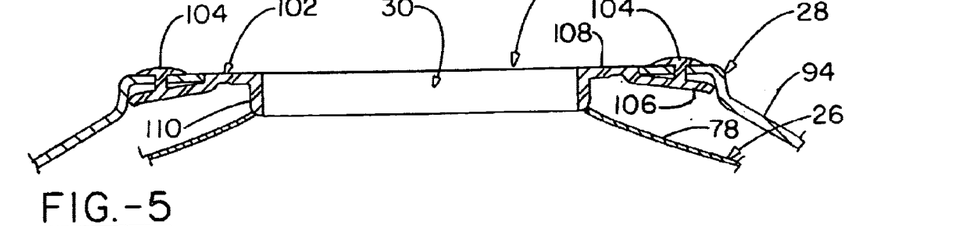
FIG. 5 is an enlarged sectional view of the fan housing as may be taken at line 5—5 of FIG. 3 illustrating a first configuration for an air intake seal.

Referring now to FIG. 5, it can be seen that an air intake seal is designated generally by the numeral 100. In one embodiment, shown in FIG. 5, the seal 100 includes a collar 102 which is attached to the shroud 28 by a plurality of rivets 104. The collar, which is preferably made of nylon, provides an outer flange 106 which is attached to the underside of the shroud around the inlet 30. Extending from the flange is a flat portion 108. And extending downwardly from the flat portion 108 is a finger 110 which is virtually in contacting relationship with the tapered disc 78 of the working air fan 26. Upon assembly, the collar is "burned in" so that the finger 110 is in as close a relationship with the eye hole 82 as possible. As such, the fan freely rotates about the finger, but the gap between the finger and the fan disc 78 is de minimis.

Figure 6:
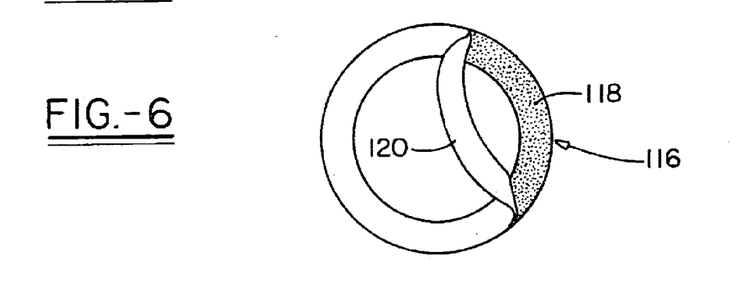
FIG. 6 is a plan view of another embodiment for an air intake seal as may be applied to the fan housing shown in FIG. 3.
Figure 7:
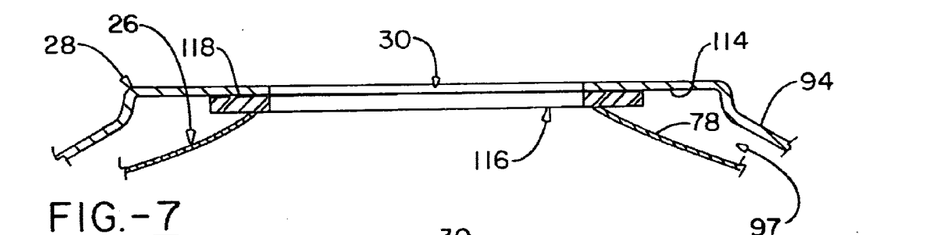
FIG. 7 is an enlarged sectional view similar to FIG. 5 showing the bore seal of FIG. 6 mounted to the fan housing.

Alternatively, as shown in FIGS. 6–7, the air intake seal 100 may utilize a shroud inner surface 114 with a seal ring 116 attached thereto. The seal ring 116 is provided with an adhesive material 118 that is exposed by removing a liner 120. The adhesive portion is then pressed upon the shroud inner surface 114. As can be seen, the ring 116 has an inner diameter substantially equal to the inner diameter of the inlet 30. In the preferred embodiment, the seal ring 116 is made from expanded polytetrafluoroethylene, manufactured by Gore-Tex, Inc.

Figures 8, 9:
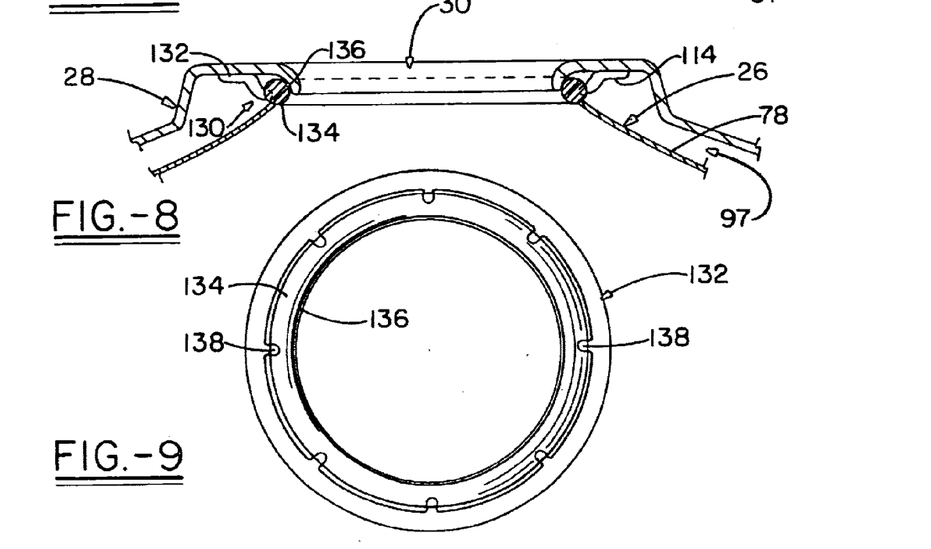
FIG. 8 is an enlarged sectional view of another embodiment for an air intake seal.
FIG. 9 is a plan view of the seal embodiment shown in FIG. 8.

In another alternative, as shown in FIGS. 8 and 9, the air intake seal 100 may utilize the shroud inner surface 114 and a retaining ring 130. The ring 130 is larger in diameter than the eyelet 30 and has a flange 132 that is connected to the shroud 28, preferably by spot welding. A seal strip 134, which is an extruded length of expanded polytetrafluoroethylene, is cut to a length equal to a diameter around the eyelet 30. The strip 134 is positioned between the flange 132 and the eyelet 30. It will be appreciated that a lip 136 extends around the eyelet as a result of its formation. The seal strip 134 snugly fits between the lip 136 and the flange 132. To hold the strip in place, detents 138 are staked about the flange 132. The strip is of a size to at least frictionally engage the fan disc 78.

In all these embodiments, the seal 100 significantly reduces or closes the gap 97 provided between the tapered disc 78 and the inner surface 114. In other words, the seal 100 minimizes entry of working air into the gap 97.

Figure 1:
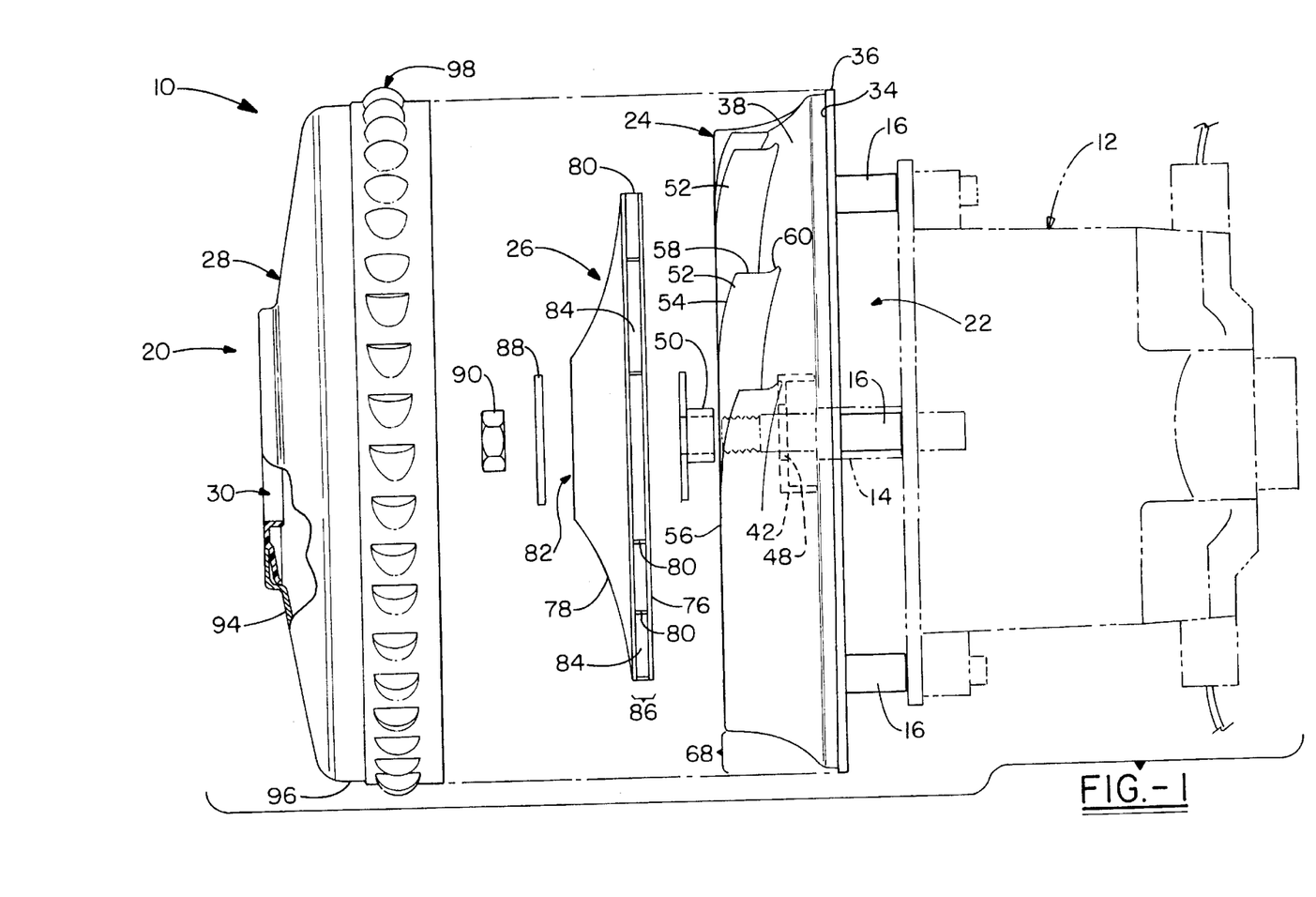
FIG. 1 is an elevational view illustrating an assembly comprised of a fan and housing configuration in accordance with the present invention as these may be mounted to an electric motor, the motor being shown via ghost lines for the purposes of the illustration.
Figure 2:
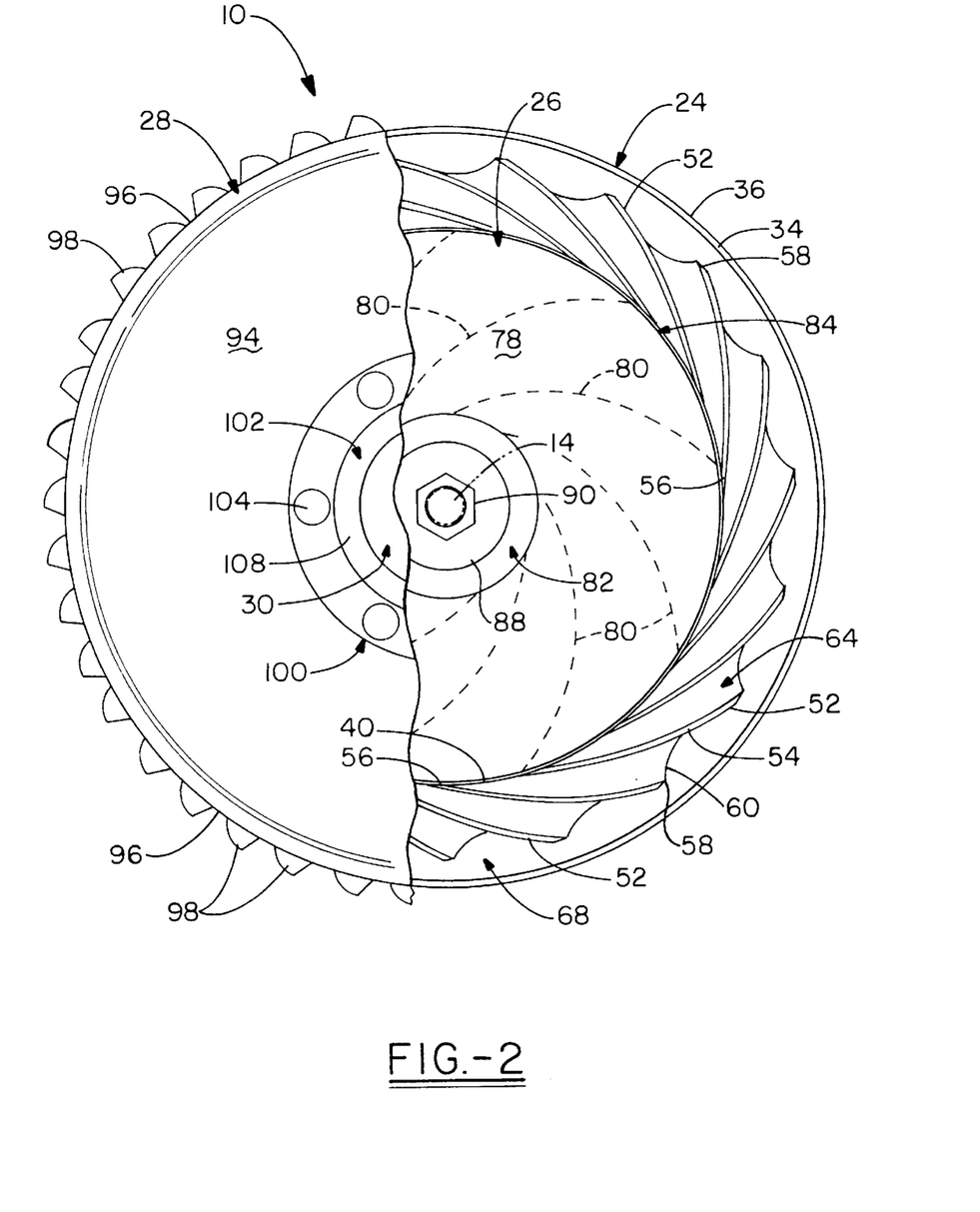
FIG. 2 is an elevational view, partially broken away, of the fan/housing assembly as these may be mounted to a motor shaft.
Figure 3:
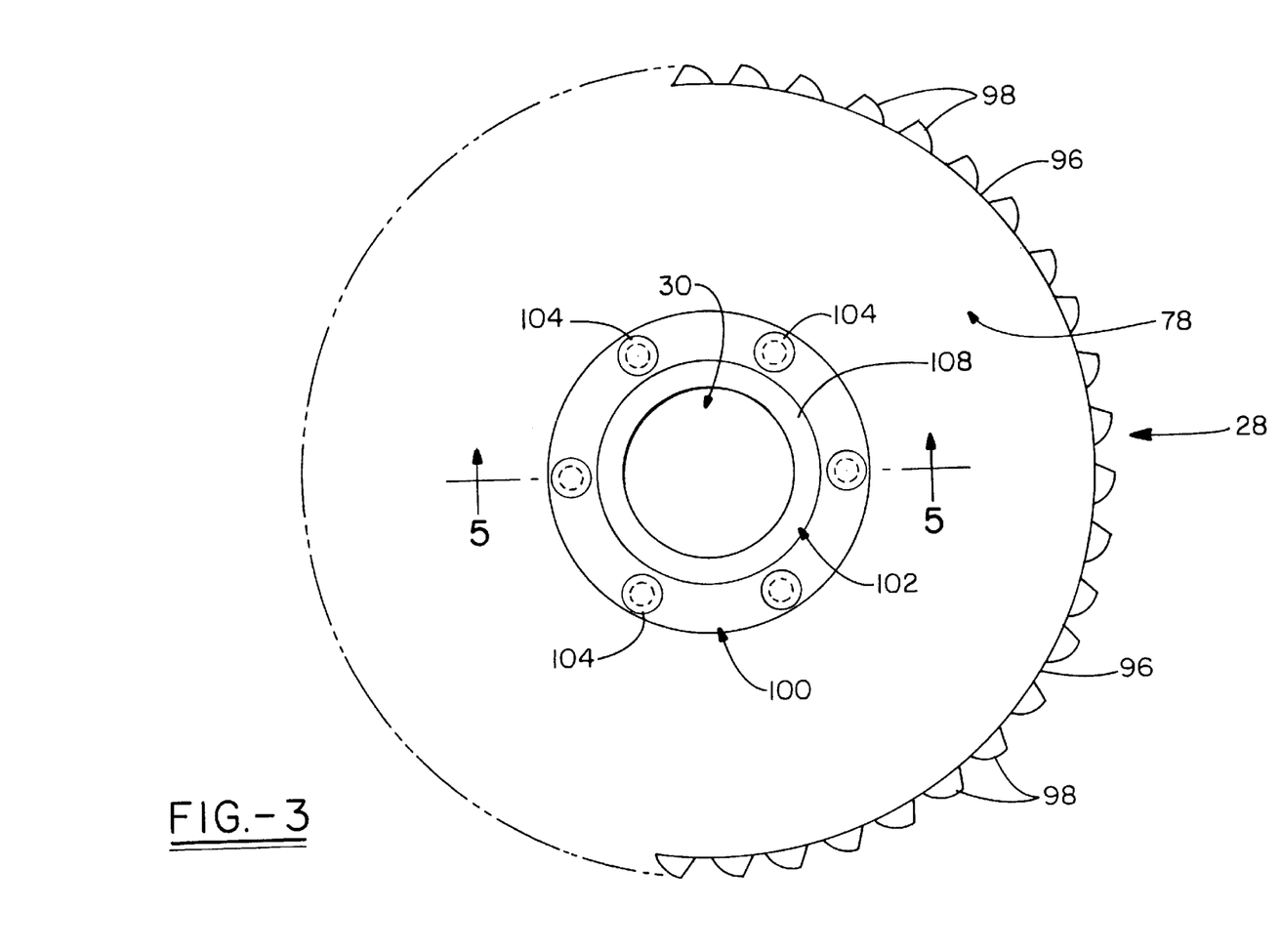
FIG. 3 is an elevational view of a fan shroud with a portion thereof being continued via ghost-line showing.

Operation of the assembly 10 will now be described. Generally, the motor within the motor housing 12 is energized and rotates the shaft 14. This, in turn, rotates the fan 26 and working air is drawn through the fan assembly 20. Features contained in the working air fan assembly 20 which greatly enhance the flow-through of the working air include the air intake seal 100. The alignment of the intake eyelet 30 and the fan eyehole 82 is such that air is normally drawn into the area between the discs 76 and 78. To minimize the turbulence in the shroud and, in particular, between the tapered disc 78 and the interior surface of the shroud inner surface 114, the intake seal 100 precludes direct entry of working air into this area. Accordingly, a significant portion of the working air is drawn through the fan 26 and not diverted to the area between the fan and the shroud. As the fan rotates, the working air is captured by the fan vanes 80 and exhausted out the exhaust ports 84 in the exhaust region 86.

Figure 4:
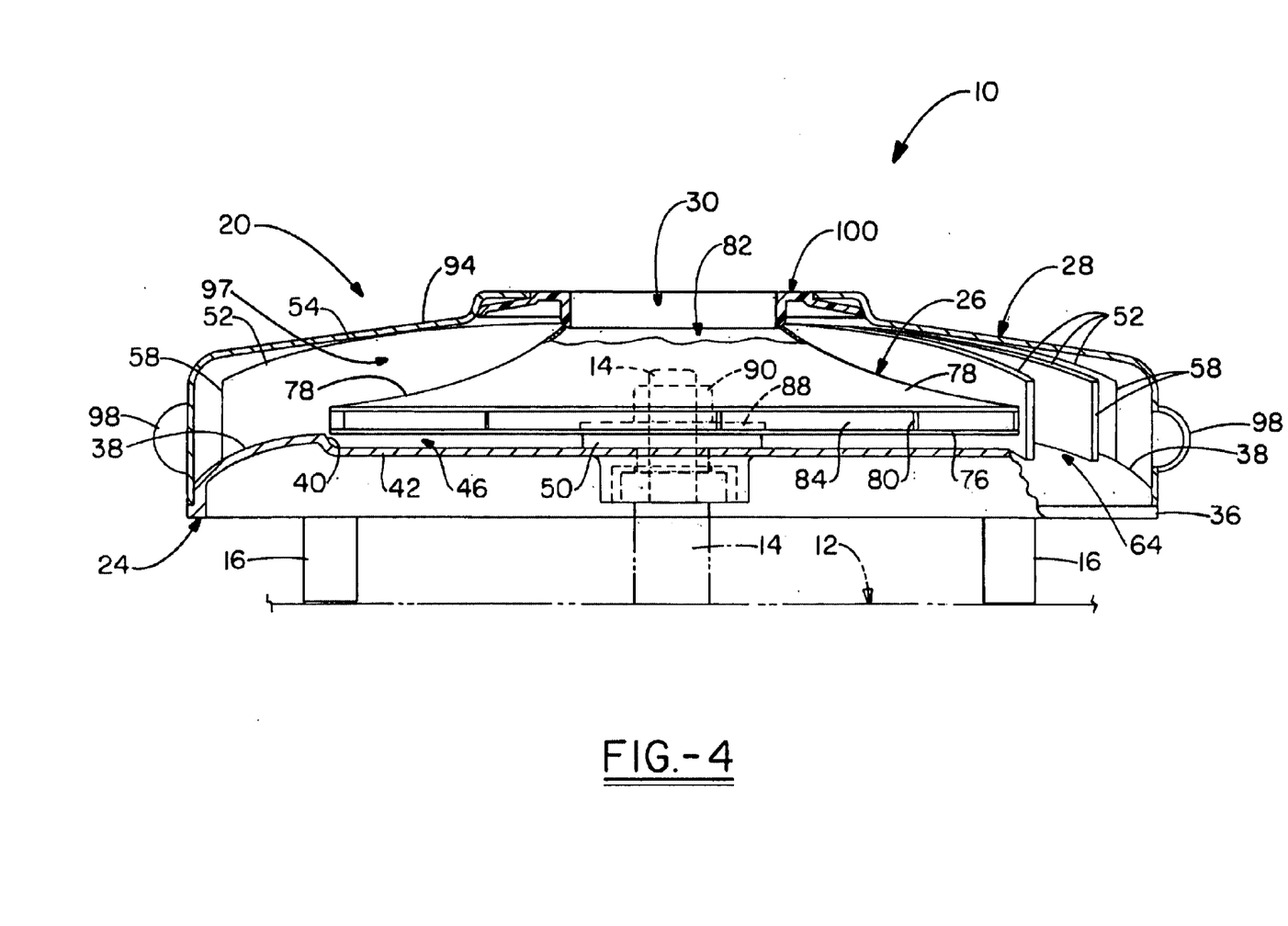
FIG. 4 is a rear elevational view of a fan shroud, a working air fan, and an end bracket.

Another significant feature of the present invention is that the plurality of vanes 52, along with the inner rim 40 and the base 42, form a fan chamber 46 in which the fan 26 rotates. The leading ends 56 of the vanes 52 are disposed closely about the outer periphery of the fan 26 around the exhaust region 86. Indeed, each vane 52 has a top edge 54 which is of such a height so as to be equivalent to or larger than the height of the exhaust region 86. Accordingly, almost as soon as the working air is expelled from the fan exhaust ports 84, it is deflected and captured by the leading ends 56 and received in the channels 64 formed by the adjacent vanes 52 and the shroud 94. Since the channels are covered by the underside of the shroud 28 for at least a portion of their length, the momentum of the working air is substantially maintained. The working air is then gradually expanded and directed outwardly and downwardly along the sloping shoulder 38. At the trailing ends 58 of the vanes 52, which are of equivalent radial distance, the working air is deposited into the annular gathering chamber 68. The air circulates downwardly around the chamber 68 and becomes pressurized and then exits the shroud 28 through the shroud ports 98.

Figure 10:
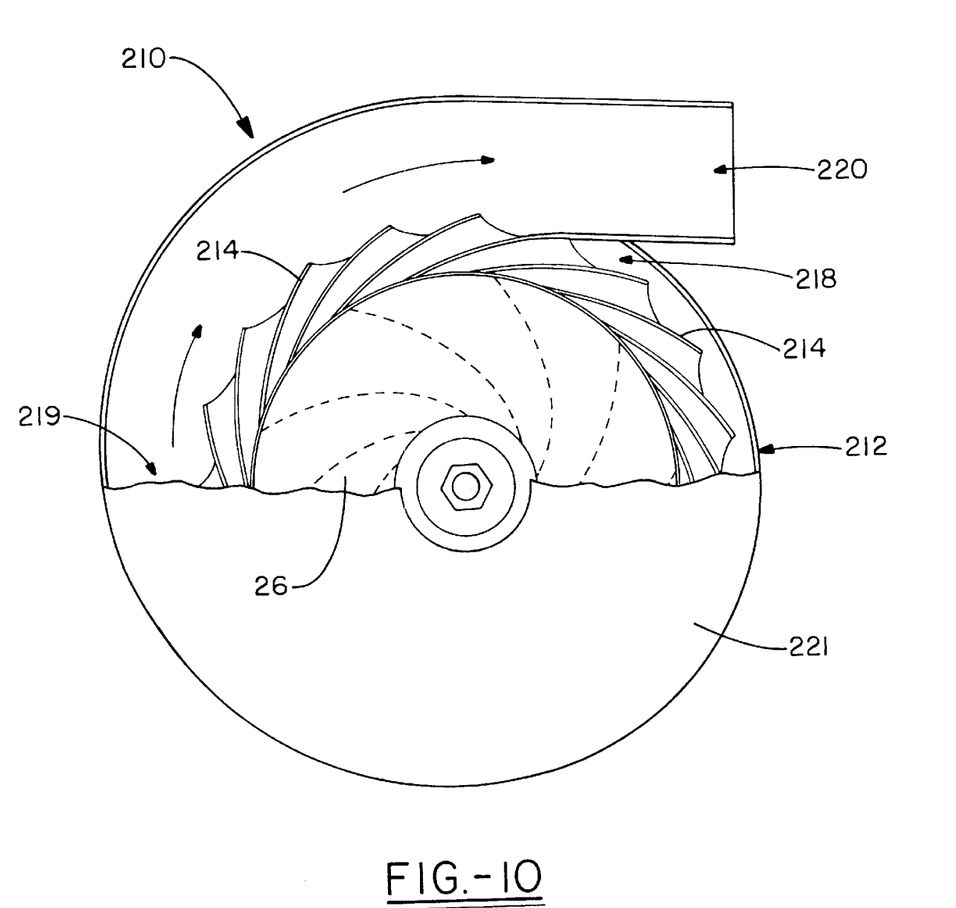
FIG. 10 is an elevational view of a tangential bypass motor/fan assembly with a covering shroud partially broken away.

Referring now to FIG. 10, a variation of the inventive concept may be employed with a tangential discharge bypass motor/fan assembly, designated generally by the numeral 210. The assembly 210 incorporates many of the same structural features of the assembly 10, including, but not limited to, a fan end bracket 212 which has a plurality of curvilinear vanes 214. As in the other embodiment, one end of the vanes 214 are closely positioned about the outer periphery of the fan 26. An outer periphery of the end bracket 212 is logarithmically shaped and increasing in size from an initial discharge area 218 through a gradually expanding discharge area 219 to a tangential exhaust port 220. A form-fitting fan shell 221 having an axial inlet fits over the end bracket 212. As in the other embodiment, the inner surface of the shell 221 contacts at least a portion of each vane's top edge. As such, the channels between the vanes 214 are partially enclosed near the fan outer periphery. This greatly assists in maintaining the momentum of the working air after it exits the fan.

The logarithmically-shaped discharge area gradually increases from the vanes furthest away from the exhaust port to the vanes nearest the exhaust port. For example, the outlet area (the volume between the guide vanes furthest from the port 220) plus about 5% of that area yields the discharge area 218. The outlet area of subsequent adjacent guide vane discharges (plus about 5%) is added to the previous area to form the logarithmic shape. This configuration greatly assists in efficiently moving the working air toward the port 220. The assembly 210 operates almost identically as the assembly 10 except for the tangential discharge. The assembly 210 can be provided with any of the air intake seal embodiments disclosed for use with the assembly 10.

Based upon the foregoing description, the advantages of the present invention are readily apparent. In particular, the amount of turbulence and extraneous airflow which interferes with the working air flowing through the assemblies 10, 210 is significantly reduced. In particular, the working air is moved directly from the fan to a radial diffuser area/gathering chamber that unloads the pressure caused by the fan. The air then gradually slows down and is circulated into the gathering chamber 68 and then is efficiently maneuvered out of the shroud 28. It has been determined that the air loses a significant amount of driving force once it leaves the apertures. Accordingly, to minimize turbulence and increase efficiency, it has been determined it is much more effective to immediately capture the working air via the vanes as it is generated by the fan. This air is then gently expanded and its pressure reduced in the gathering chamber to collectively force the air out from the shroud ports. Whereas most prior art fans provide an operating efficiency anywhere from between 27–37% efficiency, this new design has been shown to have at least about 50% efficiency. Efficiency, as used in this context, is a factor of motor efficiency and blower efficiency, wherein it has been determined that turbulence/interference within the fan shroud greatly diminishes the airflow therethrough which causes the motor to work harder and generate heat and losses in the system. In the present invention, the losses are significantly reduced to provide a longer-lasting motor assembly and other tangible benefits.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A bypass motor assembly, comprising:

a motor having a rotatable shaft;

a working air fan secured to said rotatable shaft;

a shroud having an intake eyelet and at least one exhaust aperture; and an end bracket having a shaft hole through which said rotatable shaft extends, said end bracket and said shroud partially enclosing said working air fan, wherein rotation of said working air fan draws air in through said intake eyelet and exhausts the air through said at least one exhaust aperture;

said end bracket having a plurality of channels that slope downwardly and outwardly away from said working air fan toward said at least one exhaust aperture, wherein said channels extend from an inner periphery in circumferential alignment with the outer periphery of said working air fan toward an outer periphery of said end bracket.

2. The bypass motor assembly according to claim 1, wherein said channels gradually expand as they get closer to said at least one exhaust aperture.

* * * * *